United States Patent
Weinzierle et al.

(10) Patent No.: US 10,113,901 B2
(45) Date of Patent: Oct. 30, 2018

(54) METHOD FOR EVALUATING A TDR LIMIT LEVEL SWITCH

(71) Applicant: VEGA Grieshaber KG, Wolfach (DE)

(72) Inventors: Christian Weinzierle, Wolfach (DE); Levin Dieterle, Oberwolfach (DE)

(73) Assignee: VEGA GRIESHABER AG, Wolfach (DE)

( * ) Notice: Subject to any disclaimer, the term of this patent is extended or adjusted under 35 U.S.C. 154(b) by 55 days.

(21) Appl. No.: 15/018,308

(22) Filed: Feb. 8, 2016

(65) Prior Publication Data
US 2016/0231158 A1 Aug. 11, 2016

(30) Foreign Application Priority Data
Feb. 11, 2015 (DE) .................. 10 2015 202 448

(51) Int. Cl.
| | |
|---|---|
| G01F 25/00 | (2006.01) |
| G01F 23/00 | (2006.01) |
| G01F 23/284 | (2006.01) |
| G01S 13/04 | (2006.01) |
| G01S 13/88 | (2006.01) |

(52) U.S. Cl.
CPC ...... *G01F 25/0061* (2013.01); *G01F 23/0069* (2013.01); *G01F 23/0076* (2013.01); *G01F 23/2845* (2013.01); *G01S 13/04* (2013.01); *G01S 13/88* (2013.01)

(58) Field of Classification Search
CPC ............. G01F 23/0076; G01F 23/0061; G01F 23/0069; G01F 23/00
See application file for complete search history.

(56) References Cited

U.S. PATENT DOCUMENTS

| | | | | |
|---|---|---|---|---|
| 4,547,972 A | * | 10/1985 | Heidel ................. | G01C 9/00 33/299 |
| 8,655,605 B2 | * | 2/2014 | Welle .................. | G01F 23/284 702/55 |
| 8,700,357 B2 | * | 4/2014 | Fehrenbach ........... | G01F 23/28 702/166 |
| 8,931,339 B2 | | 1/2015 | Muller et al. | |
| 2005/0130012 A1 | * | 6/2005 | Tamamura .......... | G01F 23/0076 73/291 |
| 2006/0044145 A1 | | 3/2006 | Akerstrom et al. | |
| 2009/0095070 A1 | * | 4/2009 | Battefeld ............... | B01D 21/30 73/290 V |

(Continued)

FOREIGN PATENT DOCUMENTS

| | | | |
|---|---|---|---|
| CA | 2286439 A1 * | 4/2001 | .......... G01F 23/284 |
| CA | 2 325 174 | 6/2001 | |

(Continued)

*Primary Examiner* — Lisa Caputo
*Assistant Examiner* — Punam Roy
(74) *Attorney, Agent, or Firm* — Fay Kaplun & Marcin, LLP (57) ABSTRACT

TDR limit level switch determines whether or not the measuring probe is surrounded by the filling material on the basis of the positions relative to the transmission pulse that can be read out from the detected measuring signal and on the basis of the associated amplitudes of the reflections of the transmission pulse on the coupling point and on the end of the measuring probe. In this way, a limit level message can be formed in a simpler, more secure and more reliable manner.

11 Claims, 7 Drawing Sheets

(56) References Cited

U.S. PATENT DOCUMENTS

| | | | |
|---|---|---|---|
| 2010/0156702 A1 | 6/2010 | Edvardsson | |
| 2011/0214502 A1 | 9/2011 | Zhang | |
| 2012/0056774 A1 | 3/2012 | Wennerberg et al. | |
| 2013/0269414 A1* | 10/2013 | Ferraro | G01F 23/284 73/1.73 |
| 2017/0284854 A1* | 10/2017 | Skowaisa | G01S 7/4026 |

FOREIGN PATENT DOCUMENTS

| | | | | |
|---|---|---|---|---|
| DE | 101 15 150 | 4/2002 | | |
| DE | 10 2005 015 548 | 10/2006 | | |
| DE | 10 2009 036 527 | 2/2011 | | |
| DE | 20 2013 102 514 | 8/2013 | | |
| EP | 1 128 169 | 8/2001 | | |
| EP | 1816449 A1 * | 8/2007 | | B01D 21/30 |
| EP | 1 412 710 | 9/2015 | | |
| WO | 2014/198582 | 12/2014 | | |
| WO | WO 2015139785 A1 * | 9/2015 | | G01S 7/4026 |

\* cited by examiner

METHOD FOR EVALUATING A TDR LIMIT LEVEL SWITCH

REFERENCE TO RELATED APPLICATIONS

This application claims the benefit of the filing date of German Patent Application Serial No. 10 2015 202 448.2 filed on 11 Feb. 2015, the disclosure of which is hereby incorporated by reference.

FIELD OF THE INVENTION

The invention relates to measuring limit levels. In particular, the invention relates to a TDR limit level switch, to a method for determining a limit level of a filling material in a container, to a program element and to a computer-readable medium.

TECHNICAL BACKGROUND

In certain applications, it is expedient to detect limit levels in order for example to prevent a container, in which a filling material is located, from overflowing or running dry. Detecting a predefined filling level (limit level) can be advantageous in particular in process tanks, storage tanks, silos or pipelines used in the process manufacturing industry. Limit level switches, also known as limit switches, limit level detectors or limit level measuring instruments, are used for this purpose. Devices of this type can be used for a wide range of liquids and granulated or powdered bulk material.

Different limit level switches are used depending on the physical property of the filling material and on the individual process conditions. For example, TDR detectors (time-domain reflectometry), vibration limit switches and capacitive measurement sensors are known. A switching command generated by the limit level switch either starts or stops filling apparatuses, such as conveying belts or pumps, for example.

The measuring signal detected by the limit level switch varies depending on whether or not the measuring probe is surrounded by the filling material. The measuring signal may also depend on whether or not the measuring probe is clean or whether there is a build-up of deposits (soiling) thereon. In order to reliably evaluate the detected measuring signal, costly evaluation methods are often employed.

SUMMARY OF THE INVENTION

A first aspect of the invention relates to a TDR limit level switch comprising a measuring probe and an evaluation unit. The measuring probe is intended for immersion into a filling material and for detecting a measuring signal corresponding to the state of the measuring probe, for example relative to the filling material. "State of the measuring probe" is to be understood in particular to mean the following states: "measuring probe covered (half-covered or completely covered) by the filling material", "measuring probe not covered by the filling material" and "soiled measuring probe".

The measuring signal detected by the probe can vary according to the state of the measuring probe.

The TDR limit level switch further comprises an evaluation unit for evaluating the detected measuring signal. The measuring probe has a coupling point at which the transmission pulse generated by the TDR limit level switch is coupled into the measuring probe. The detected measuring signal is ultimately produced from the transmission pulse and consists for example of the original transmission pulse and the reflections of the transmission pulse produced therefrom on the locations on the measuring probe at which there is a jump in impedance. These locations are in particular the coupling point and the end of the probe.

The evaluation unit is designed to determine whether or not the measuring probe is surrounded by the filling material on the basis of the amplitudes of the measuring signal detected at at least two temporally definable reference positions relative to the transmission pulse.

Alternatively or additionally, the evaluation unit can be designed to determine the corresponding two amplitudes $Y_{E1}$, $Y_{E2}$ of the reflections of the transmission pulse on the coupling point and on the end of the measuring probe, respectively, on the basis of the two positions in the echo curve $X_{R1}$, $X_{R2}$ that are determined relative to the position $X_{R0}$ of the transmission pulse and that can be read out from the detected measuring signal, and to decide whether or not the measuring probe is surrounded by the filling material by using the two amplitudes.

According to one embodiment of the invention, the evaluation unit can also be designed to determine or decide whether the measuring probe is soiled on the basis of the positions (relative to the transmission pulse) that can be read out from the detected measuring signal, on the basis of the associated amplitudes of the reflections of the transmission pulse on the coupling point and on the end of the measuring probe, and on the basis of the minima in the regions of these reflections.

If the measuring probe is soiled, it may be that the evaluation unit cannot decide whether or not the probe is covered by the filling material because the soiling or deposit build-up influences the measuring signal so greatly that immersion of the measuring probe into the filling material can no longer be detected.

At this juncture, it should be noted that the positions and amplitudes of the reflections of the transmission pulse described above and in the following can be read from the echo curve that the evaluation unit can produce from the measuring signal. In such an echo curve, the measuring signal amplitude is plotted against signal propagation time. The signal propagation time corresponds to the position of the relevant reflector (coupling point, end of the measuring probe, filling material surface).

According to a further embodiment of the invention, the evaluation unit is designed to determine the positions relative to the transmission pulse and the amplitudes of the reflections of the transmission signal on the coupling point and on the end of the measuring probe (or a reflector in the probe) from a reference measurement with an empty container.

A reference echo curve can be produced from the measuring signal produced by means of the reference measurement, with which reference echo curve the echo curve of the actual measurement can be compared. In particular, the positions and corresponding amplitudes of the reflections of the transmission pulse on the coupling point and on the end of the measuring probe can be determined from this reference echo curve. If these positions are determined from the reference echo curve, it can be assumed (by approximation) that these positions likewise correspond to the coupling point and the end of the measuring probe in the actual echo curve (which may not be 100% correct if the measuring probe is covered with respect the end of the measuring probe because the transmission signal pulse propagates in the filling medium at a different speed compared with the propagation in the container atmosphere).

According to a further embodiment of the invention, the TDR limit level switch comprises a position sensor that is integrated in the limit level switch and is intended for collecting information regarding an installation position of the limit level switch in the container in which the filling material is located, and for transmitting the collected information to the evaluation unit. In this case, the evaluation unit is designed to take into account the information collected by the position sensor when evaluating the measuring signal.

According to a further embodiment of the invention, the information collected by the position sensor relates to both the orientation of the limit level switch relative to the filling material, and the position of the limit level switch in the container.

According to a further embodiment of the invention, the collected information regarding the orientation of the limit level switch is limited to indicating whether the limit level switch is oriented vertically upwards, oriented vertically downwards or located horizontally in the container.

In order to evaluate the measuring signal, the evaluation unit thus consults the information collected by the position sensor. As a result, the evaluation method is simplified overall because the position sensor can provide valuable information regarding the installation position (for example oriented vertically upwards, oriented vertically downwards, or located horizontally), and therefore the evaluation unit can rule out certain scenarios from the outset.

Therefore, a measuring signal that is detected by a vertically upwards oriented measuring probe that is half-covered by the filling material has different characteristics from a measuring signal that was detected by a vertically downwards oriented measuring probe that was half-covered by the filling material. However, it is possible that the measuring signal of a half-covered, vertically upwards oriented measuring probe has similar characteristics to the measuring signal of a measuring probe that is uncovered yet soiled, i.e. having a build-up of deposits thereon.

Thus, when the measuring signal has a particular characteristic, it can be concluded that the measuring probe is half-covered by the filling material or that said measuring probe is soiled solely from the information as to whether the measuring probe is oriented vertically upwards or downwards.

According to a further embodiment of the invention, the position sensor is designed to automatically collect information regarding the installation position of the limit level switch in the container when the limit level switch is put into operation. Thus, there is no need for complex parameterisation.

According to a further aspect of the invention, a method for determining a limit level of a filling material in a container is disclosed, in which a transmission pulse is first coupled into the measuring probe at a coupling point of a measuring probe. Then, a measuring signal is detected that corresponds to the state of the measuring probe relative to the filling material (and that is produced from the transmission pulse by the transmission pulse reflecting on locations on the measuring probe at which a jump in impedance occurs). It is determined whether or not the measuring probe is surrounded by filling material on the basis of the positions relative to the transmission pulse that can be read out from the detected measuring signal and from a reference signal and on the basis of the associated amplitudes of the reflections of the transmission pulse on the coupling point and on the end of the measuring probe.

A further aspect of the invention relates to a program element which, when executed by a processor of a limit level switch, instructs the limit level switch to carry out the steps described above and in the following.

According to a further aspect of the invention, a computer-readable medium is disclosed on which an above-described program element is stored.

A central idea of the invention can be considered that of drawing a conclusion on whether the TDR limit level switch is "covered" (and not heavily soiled), "not covered" (and also not heavily soiled) or "soiled" by analysing the measuring signal (or the echo curve generated therefrom). In order to differentiate between the states, the positions and the amplitudes at the coupling point and at the end of the probe relative to the position of the transmission pulse are assessed by comparing them to thresholds.

Embodiments of the invention are described below with reference to the drawings.

DETAILED DESCRIPTION OF EMBODIMENTS

The drawings in the figures are schematic and not to scale.

Where the same reference signs are used in different figures in the following description of the figures, they denote the same or similar elements. The same or similar elements may also be denoted by different reference signs, however.

Figure 1:
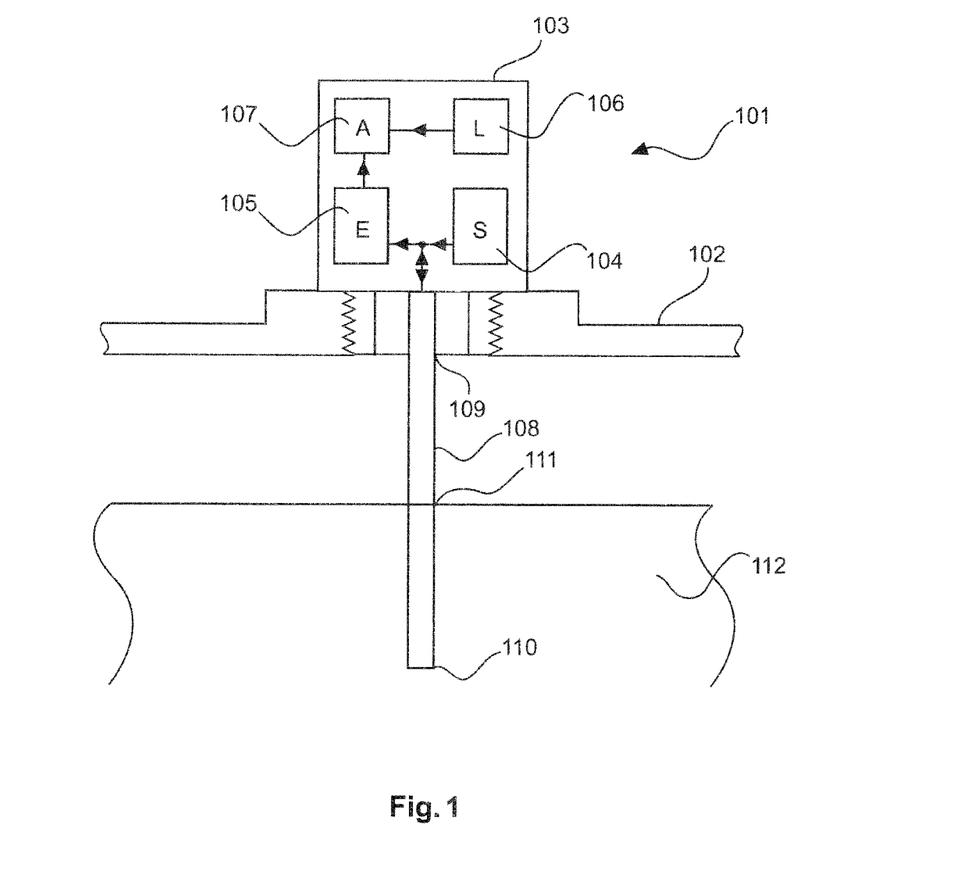
FIG. 1 shows a TDR limit level switch installed in a tank, according to an embodiment of the invention.

FIG. 1 shows a container 102 into which a TDR limit level switch 101 according to an embodiment of the invention is screwed. A filling material 112 is located in the container. The TDR limit level switch 101 operates according to the principle of time-domain reflectometry (TDR). A TDR sensor generally consists of an electronics unit 103 and a measuring probe 108, for example in the form of an electrically conductive rod or a cable.

By way of example, the measuring probe 108 has a length of a few centimeters, for example less than 4 cm, and therefore the reflections of the transmission pulse on the coupling point and on the end of the rod interfere with one another or are superimposed on one another, which makes it more difficult to evaluate the echo curve.

It should be noted that measuring probes currently on the market are significantly longer (≥0.5 m), and therefore no interference between the reflections of the transmission pulse occurs between the coupling point, the end of the rod and the filling medium, and the individual extreme values in the echo curve can be properly separated and evaluated individually.

An electromagnetic signal is produced in the electronics unit and is coupled onto the measuring probe 108 at the coupling point 109. The signal propagates along the probe in a guided manner. Jumps in impedance along the measuring probe result in certain portions of the high-frequency transmission signal (in this case, a transmission pulse) being reflected and being detected by the electronics unit as a received signal. In the electronics unit 103, the received reflection ratios along the measuring probe are transformed into an echo curve and the limit level is assessed therefrom. The method described here and in the following results in a build-up of deposits on the measuring probe and on fixtures in the container, for example nozzles, being taken into account. It is only by taking into account both a build-up of deposits and different installation situations of the TDR limit level switch in the container that the limit level of a wide variety of media can be determined according to the principle of time-domain reflectometry in a secure and reliable manner.

A central idea of the invention can be considered to be that the evaluation method can detect a limit level, can recognise a build-up of deposits, and takes account of the effect of container nozzles when determining the limit level. The echo curves representing the reflection ratios along the measuring probe 108 form the basis of the evaluation. The limit level sensor 101 shown in FIG. 1 operates according to the principle of time-domain reflectometry (TDR limit level switch). The limit level switch 101 is mounted in the container 102 from above. The electronics unit 103 has in particular a transmission unit 104, a receiving unit 105, a position sensor 106 and an evaluation unit 107. The position sensor is not necessarily required.

Alternatively, the position data of the sensor may also be defined by the user during parameterisation of the apparatus.

The purpose of the transmission unit 104 is to produce high-frequency signals and to couple said signals to the electrically conductive rod (the measuring probe 108). Jumps in impedance along the measuring probe 108 result in certain signal portions of the transmission signal being reflected back.

Significant reflections occur in particular in the region of the coupling point 109, a medium boundary surface 111 (a filling material surface in the example of FIG. 1) and on the end of the rod 110.

The reflection signals are received by the receiving unit 105 and converted into an echo curve. A further component of the electronics unit 103 is the position sensor 106 that can detect the installation position of the limit level detector 101. In this context, installation position is to be understood to mean the orientation of the sensor (i.e. the angle that the measuring probe 108 assumes relative to the filling material surface). In the simplest case, the position sensor can detect three possible orientations, namely "horizontal", "oriented vertically upwards" and "oriented vertically downwards".

In a more complicated embodiment, the position sensor can determine the exact angle of the measuring probe to the filling material surface. In a further embodiment, the position sensor can also determine the installation position in the container and can thus establish whether the limit level switch is installed in the container cover, on the container base or on the container wall.

In the evaluation unit 107, different states (covered, not covered, and soiled) are detected, and accordingly output, from the echo curve and by taking into account the detected installation position.

Figure 2:
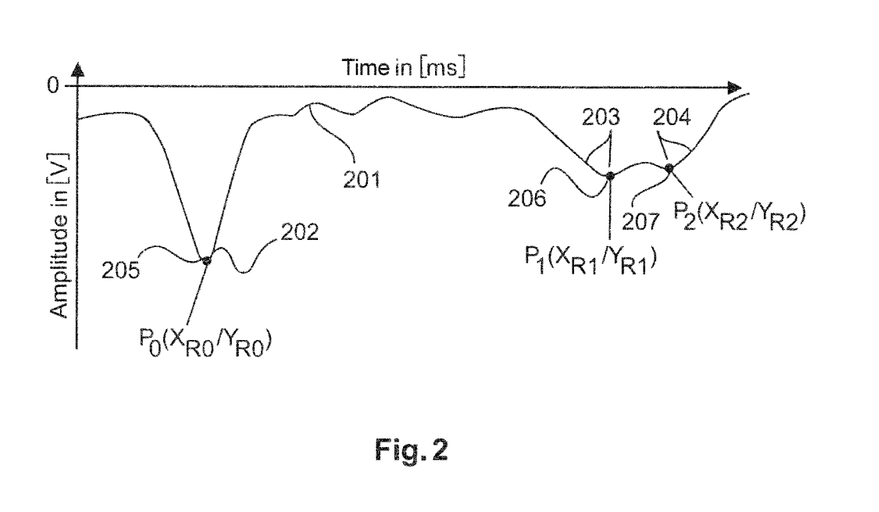
FIG. 2 shows a reference echo curve.

FIG. 2 shows a reference echo curve 201 which is known to the TDR limit level switch ex works for example. The vertical axis denotes the amplitude of the detected measuring signal and the horizontal axis denotes the time, for example in milliseconds. The zero point is located at the point of intersection of the two axes.

In order to evaluate the echo curve, three distinctive features are used. These features are the transmission pulse 202 having its minimum $P_0$ 205, the reflection of the transmission pulse on the coupling point 203 having its minimum $P_1$ 206, and the reflection of the transmission pulse on the end of the rod 204 having its minimum $P_2$ 207.

The evaluation method basically assesses the amplitudes of the received reflections of the coupling point 203 and the position thereof relative to the transmission pulse 202. Furthermore, the amplitudes of the received reflection on the end of the rod 204 and the position thereof relative to the transmission pulse 202 are taken into account when determining the limit level.

Figure 3:
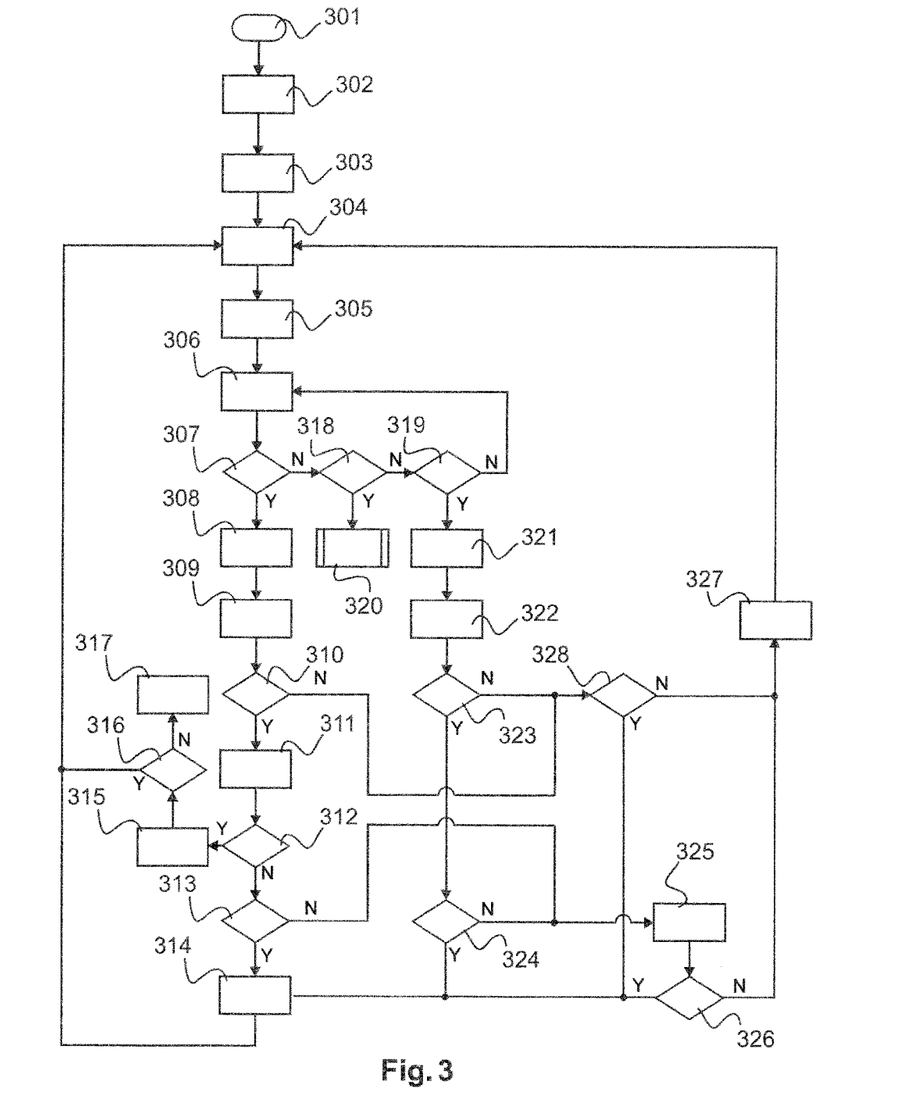
FIG. 3 is a flow chart of a method according to an embodiment of the invention.

The exact procedure of the evaluation method is described by means of the flow diagram of FIG. 3. In this diagram, the "covered", "not covered" and "soiled" states are output by means of the method.

The method starts with step 301. In step 302, the reference echo curve of FIG. 2 is measured. This takes place for example at the factory, i.e. before delivery to the customer. In step 303, the XY coordinates of the transmission pulse ($X_{R0}/Y_{R0}$), the reflection of the transmission pulse on the coupling point ($X_{R1}/Y_{R1}$) and the reflection of the transmission pulse on the end of the rod ($X_{R2}/Y_{R2}$) are determined from the reference echo curve. All this can take place at the factory.

If the limit level switch is installed in the container, an echo curve can be measured in step 304. This echo curve is for example subjected to filtering in step 305 and, in step 306, the position sensor detects the installation position of the limit level switch. This step may also take place earlier on in the procedure, before the echo curve is measured in step 304, and must not then be carried out again if the sensor no longer varies its installation position. The sensor position can also be input by the user.

However, the position sensor preferably automatically detects the installation position of the sensor when the sensor is put into operation so as to minimise the input needed by the user to the greatest extent possible.

In step 307, it is checked whether the installation position is the installation position shown in FIG. 1, i.e. a downwards oriented measuring probe at the top of the container cover. If this is the case, the method jumps to step 308 in which the amplitude $Y_{E1}$ at the position $X_{R1}$ of the received echo curve is determined. Then (or before this), the amplitude $Y_{E2}$ at the position $X_{R2}$ on the echo curve is determined in step 309. In step 310, it is then established whether the value $Y_{E1}$ is between a first threshold $SW_{11}$ and a second threshold $SW_{12}$. If this is the case, in step 311, a minimum is searched for in the region between two further thresholds $SE_{13}$ and $SW_{14}$, i.e. in a particular time interval of the echo curve in which the reflection on the coupling point is located.

The thresholds described here and below are empirical values that can be obtained using test measurements. The values thereof depend for example on the medium intended to be measured, but also particularly on the type of probe (length thereof, etc.). In a first approximation, it is possible to use the same thresholds for all media intended to be measured. However, a particular set of thresholds may also be used for each medium to be measured. In the following, echo curves for water, honey and oil are described.

After locating the minimum in the region between $SW_{13}$ and $SW_{14}$ (the minimum is denoted by reference sign 403), it is determined whether the X coordinate (time coordinate) of the minimum $X_{EM1}$ is greater than the time coordinate of the reflection of the transmission pulse on the coupling point in the reference curve $X_{R1}$, in other words, whether the minimum is offset to the right (step 312).

If this is not the case, the method jumps from step 312 to step 313 in which it is assessed whether $Y_{E2}$ (i.e. the amplitude of the echo curve at time $X_{R2}$) is greater than an additional threshold $SW_{21}$.

If this is the case, it is concluded in step 314 that the measuring probe is covered and the method goes back to step 304 in which a new echo curve can be measured. If this is not the case, the method jumps to step 325 in which a minimum is searched for in the region between $SW_{22}$ and $SW_{23}$ and it is then established in step 326 whether this minimum $X_{EM2}$ is greater than $X_{R2}$. If this is the case, it is concluded in step 314 that the probe is covered. If this is not the case, it is concluded that the probe is not covered (step 327) and the method continues to step 304, i.e. recording a further echo curve.

If, however, the conclusion is drawn in step 312 that $X_{EM1}$ is greater than $X_{R1}$, the method jumps to step 315 in which it is assumed that the measuring probe has a deposit build-up thereon. This deposit build-up is then assessed in step 315. In the following step, step 316, it is decided whether a new measurement should be enabled. If this is the case, the method jumps to step 304 in which a new echo curve can be measured. However, if, by analysing the echo curve, a conclusion is drawn on significant soiling, a new measurement can be blocked and the method jumps from step 316 to step 317 in which a message is issued to the user stating that the probe is too heavily soiled.

If it is established in step 310 that $Y_{E1}$ is not between $SW_{11}$ and $SW_{12}$, the method jumps to step 328 in which it is assessed whether or not $Y_{E1}$ is greater than $SW_{12}$. If this is the case, it is concluded that the probe is covered and the method goes to step 314. If this is not the case, the method jumps to step 327 in which it is concluded that the probe is not covered and the method continues to step 304, i.e. recording a further echo curve.

If it is established in step 307 that the probe is not in the upper installation position, it is assessed in step 318 whether said probe is in a side installation position. In this case, the method jumps to step 320 and the same evaluation is made as with the upper installation position 307 (i.e. steps 308, 309 etc. are carried out).

Otherwise, it is established in step 319 whether the probe is in the lower installation position (on the container base and oriented downwards). In this case, the method continues to step 321. Otherwise, the method jumps back to step 306 and the installation position of the limit level switch is detected once again by means of the position sensor.

In step 321, the amplitude $Y_{E1}$ at the position $X_{R1}$ is determined and, in step 322, the amplitude $Y_{E2}$ at the position $X_{R2}$ is determined. The method then continues to step 323 in which it is established whether $Y_{E1}$ is between the thresholds $SW_{11}$ and $SW_{12}$. If this is the case, the method continues to step 324 in which it is established whether $Y_{E2}$ is greater than $SW_{21}$. If this is the case, it is concluded that the probe is covered. If this is not the case, the method moves to step 325 in which a minimum is searched for in the region between $SW_{22}$ and $SW_{23}$ and then, in step 326, it is established whether this minimum $X_{EM2}$ is greater than $X_{R2}$. If this is the case, it is concluded in step 314 that the probe is covered. If this is not the case, it is concluded that the probe is not covered (step 327).

However, if $Y_{E1}$ is not found to be between $SW_{11}$ and $SW_{12}$ in step 323, the method proceeds with step 328, followed by 314 or 327, as already described above.

Figure 4:
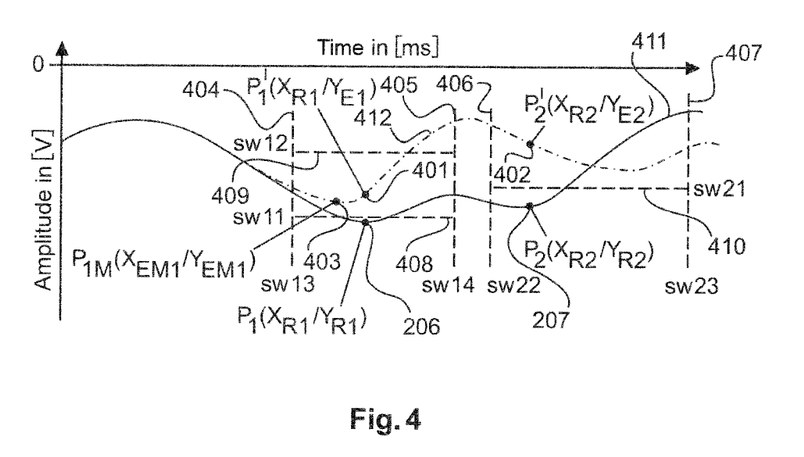
FIG. 4 shows a reference echo curve and an additional measurement curve.

FIG. 4 shows a portion of a reference echo curve 411 and an additional measurement curve 412. The coordinate origin (as also shown in FIGS. 2, 5, 6, 8 and 10) is also shown in this drawing at the point of intersection of the two axes. The echo curve 412 was measured by means of the measuring setup shown in FIG. 1, the measuring probe 108 being half covered by water. The limit level switch 101 would output the "covered" state for this measurement.

The time thresholds $SW_{13}$ and $SW_{14}$ (between which the reflection on the coupling point is located) are denoted by reference signs 404, 405, respectively; the time thresholds $SW_{22}$ and $SW_{23}$ (between which the reflection on the end of the rod is located) are denoted by reference signs 406 and 407, respectively. The amplitude thresholds $SW_{11}$, $SW_{12}$ and $SW_{21}$ are denoted by reference signs 408, 409 and 410 respectively.

The first minimum point on the reference echo curve 411 $P_1$ $(X_{R1}/Y_{R1})$ 206 corresponds to the minimum amplitude and the position (or the signal propagation time) of the reflection of the transmission pulse on the coupling point. Located directly above is the point denoted by $P_1'(X_{R1}/Y_{E1})$ 401 on the actual echo curve 412. Located to the left is the minimum point $P_1M$ $(X_{EM1}/Y_{EM1})$ 403 on the actual echo curve. The second minimum point on the reference echo curve $P_2(X_{R2}/Y_{R2})$ 207 corresponds to the reflection of the reference transmission pulse on the end of the probe, and the point $P_2'(X_{R2}/Y_{E2})$ 402 on the actual echo curve is located directly above said second minimum point.

Figure 5:
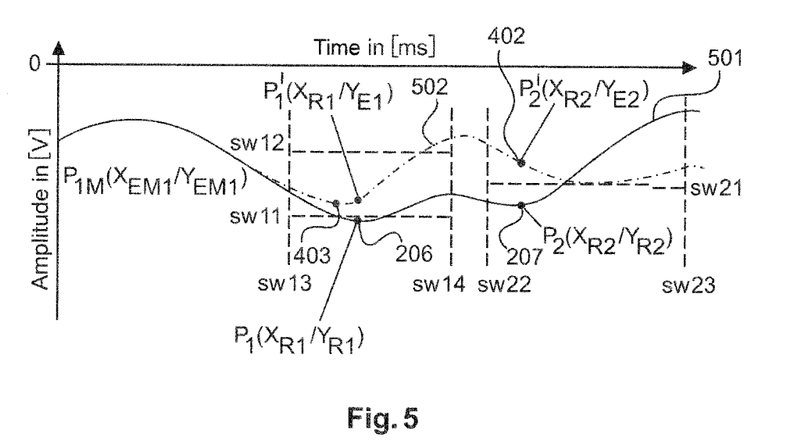
FIG. 5 shows a reference echo curve and an additional measurement curve.

This portion of the reference echo curve 501 is also shown in FIG. 5. Furthermore, an additional echo curve 502 is depicted. This was also measured using the measuring setup described in FIG. 1, the probe rod 108 being half covered by honey. The limit level sensor 101 would likewise signal "covered" in this measuring scenario.

Figure 6:
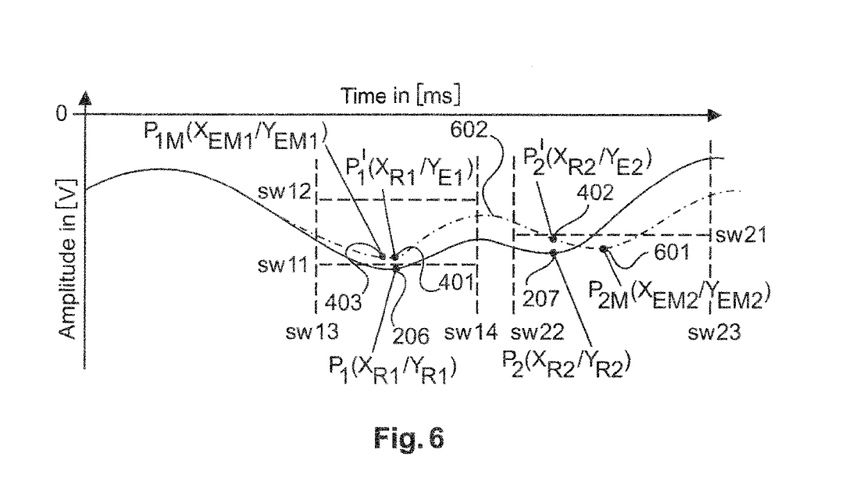
FIG. 6 shows a reference echo curve and an additional measurement curve.

FIG. 6 depicts the same portion of the reference curve as in FIG. 5. An actual echo measurement curve 602 is also depicted. This too was measured using the measuring setup described in FIG. 1, the rod 108 being half covered by oil. In this case, the evaluation output would likewise output the "covered" state. Reference sign 601 shows the measuring point $P_{2M}$ $(X_{EM2}/Y_{EM2})$ on the actual echo curve. Said measuring point is below the threshold $SW_{21}$.

The three measuring scenarios described above demonstrate that the evaluation algorithm described in FIG. 3 can be used for a wide range of media. The limit level of both media having low permittivity (oil) and filling material having high permittivity (water) can be detected in a reliable manner. Additionally, it is completely irrelevant whether electrically conductive filling material or non-conductive media are used.

Figure 7:
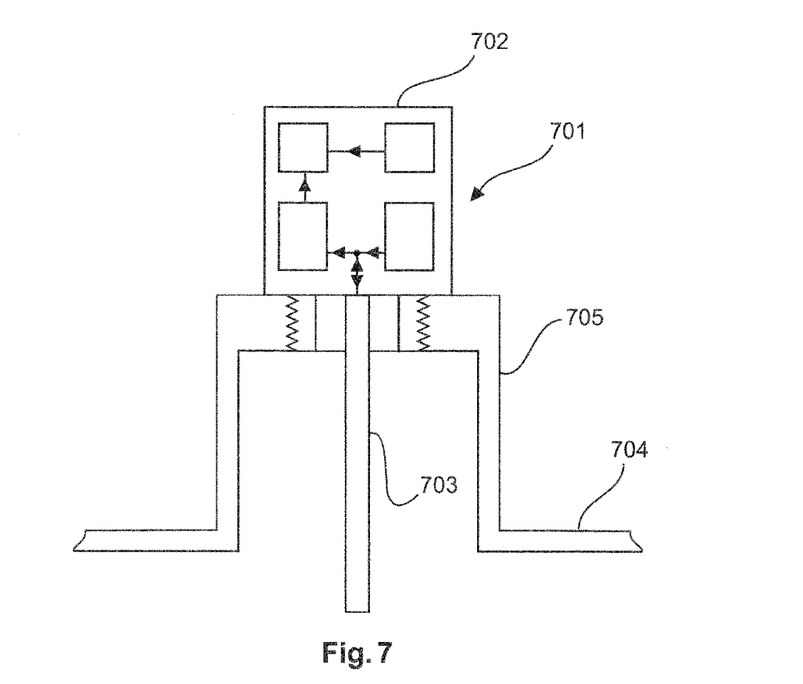
FIG. 7 shows a TDR limit level switch installed in a container, according to an embodiment of the invention.

FIG. 7 shows a further measuring setup having a TDR limit level switch 701 corresponding to the limit level switch of FIG. 1. Said limit level switch comprises an electronics unit 702 and an electrically conductive rod 703. In this embodiment, the limit level switch 701 is indirectly mounted in the container 704 by means of a screwed nozzle 705.

Figure 8:
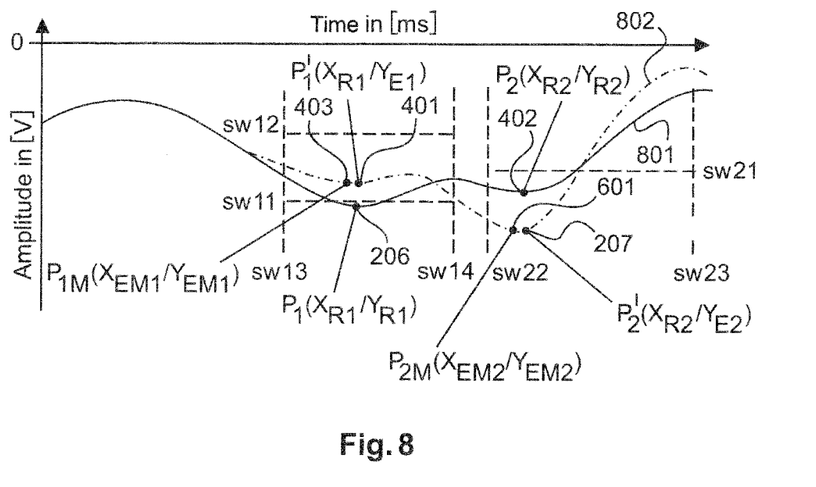
FIG. 8 shows a reference echo curve and an additional echo curve.

The effect of the nozzle 705 on the echo curve and thus on the determination of the limit level is explained in FIG.

8. FIG. 8 shows both the reference echo curve 801 and an additional actual measuring echo curve 802. The measurement curve 802 has been measured according to the embodiment described in FIG. 7. The electrically conductive rod 703 was not in contact with a medium. In this case, the evaluation algorithm according to FIG. 3 would output the "not covered" state. As a result, fixtures are recognised by the algorithm and taken into account when determining the limit level.

Figure 9:
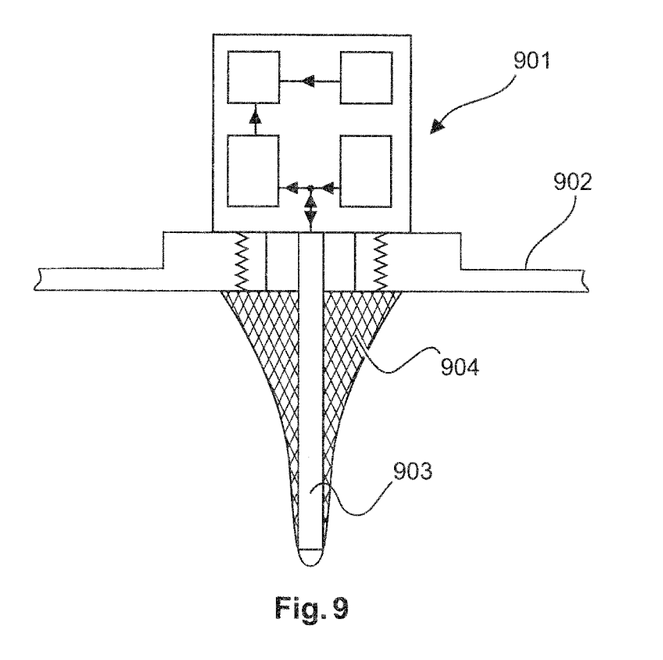
FIG. 9 shows a TDR limit level switch installed in a container, according to a further embodiment of the invention.
Figure 10:
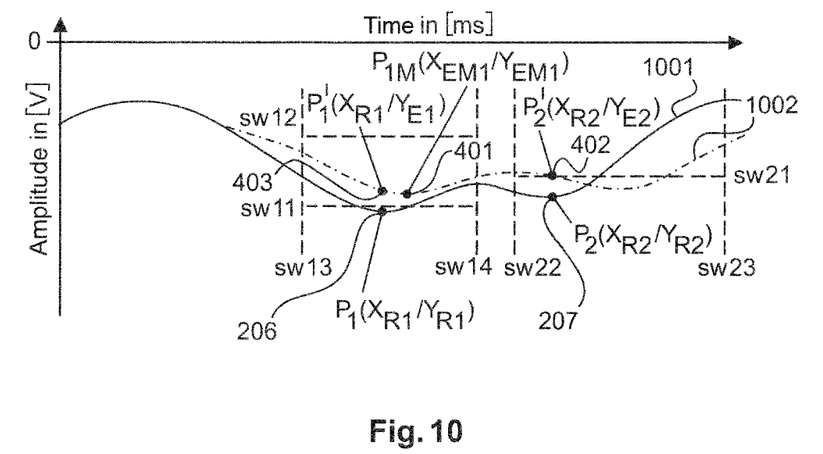
FIG. 10 shows a reference echo curve and an additional echo curve.

A further measuring scenario is shown in FIG. 9. The TDR limit level switch 901 is installed in the container 902 from above and is not in contact with a filling material. It is essential that the electrically conductive rod 903 is very heavily soiled. The effect of the deposit build-up 904 on the shape of the echo curve is shown in FIG. 10. The reference echo curve is denoted by 1001. The properties of the deposit build-up are reflected in particular in the measuring echo curve 1002. In this case, the evaluation algorithm according to FIG. 3 would output the "soiled" state.

The presented measuring scenarios show that both a deposit build-up and fixtures are recognised by the evaluation algorithm presented in FIG. 3. Furthermore, this information is factored into the limit level determination and thus results in the limit level being indicated in a reliable and secure manner.

The invention claimed is:

1. A TDR limit level switch, comprising:
   a measuring probe adapted to be immersed into a filling material, the probe detecting a measuring signal corresponding to a state of the probe;
   a transmission unit and a receiving unit, the transmission unit being configured to produce a transmission pulse $P_0$, to transmit the transmission pulse to the receiving unit via a first line and to couple the transmission pulse into the measuring probe via a second line; and
   an evaluation unit evaluating the detected measuring signal, the detected measuring signal including at least two reflections $P_1$, $P_2$ of the transmission pulse $P_0$ at locations of the measuring probe at which there is a jump in impedance,
   wherein the probe has a coupling point at which the transmission pulse $P_0$, from which the detected measuring signal results, is coupled into the probe, wherein the locations of the probe at which there is a jump in impedance are the location of the coupling point and of an end of the probe,
   wherein the evaluation unit is configured to determine if the probe is surrounded by the filling material on the basis of the positions of the amplitudes of the least two reflections $P_1$, $P_2$ relative to the transmission pulse $P_0$,
   wherein the evaluation unit is configured to determine, when the probe is installed with a downward orientation, whether the time coordinate of a reference $X_{R1}$ is greater than the time coordinate of the reflection $P_1$ and that the measuring probe is covered by the filling material, and
   wherein the evaluation unit is configured to determine, when the probe is installed with an upward orientation, whether the time coordinate of the reflection $P_2$ is greater than the time coordinate of a reference $X_{R2}$ and that the measuring probe is covered by the filling material.

2. The switch according to claim 1, wherein the at least two reflections $P_1$, $P_2$ are reflections of the transmission pulse $P_0$ at points of reflection of the transmission pulse $P_0$ on the coupling point and on an end of the probe relative to the transmission pulse $P_0$.

3. The switch according to claim 1, wherein the evaluation unit is configured to determine if the probe is soiled on the basis of the amplitudes detected in the measuring signal at the reference positions and a minima in regions of the reflections.

4. The switch according to claim 1, wherein the evaluation unit is configured to determine the positions relative to the transmission pulse $P_0$ and the amplitudes of the reflections $P_1$, $P_2$ of the transmission signal on the coupling point and on an end of the measuring probe from a reference measurement with an empty container.

5. The switch according to claim 1, further comprising:
   a position sensor integrated in the switch, the position sensor collecting information regarding an installation position of the switch in a container in which the filling material is located, the sensor transmitting the collected information to the evaluation unit,
   wherein the evaluation unit is configured to take into account the information collected by the position sensor when evaluating the measuring signal.

6. The switch according to claim 5, wherein the information detected by the position sensor relates to both an orientation of the switch relative to the filling material and a position of the switch in the container.

7. The switch according to claim 5, wherein the collected information relating to an orientation of the switch is limited to indicating if the switch is oriented vertically upwards, oriented vertically downwards or located horizontally in the container.

8. The switch according to claim 5, wherein the position sensor is configured to automatically collect the information relating to an installation position of the switch in the container when the switch is in an operational mode.

9. A method for determining a limit level of a filling material in a container, comprising:
   producing a transmission pulse $P_0$ by a transmission unit;
   transmitting the transmission pulse $P_0$ to a receiving unit via a first line and coupling in the transmission pulse $P_0$ at a coupling point of a measuring probe via a second line;
   detecting a measuring signal corresponding to a state of the probe, the measuring signal including least two reflections $P_1$, $P_2$ of the transmission pulse $P_0$ at locations of the probe at which there is a jump in impedance;
   determining if the probe is surrounded by the filling material on the basis of the positions of the amplitudes, detected in the measuring signal, of the at least two reflections $P_1$, $P_2$ relative to the transmission pulse $P_0$,
   wherein the locations of the probe at which there is a jump in impedance are the location of a coupling point and of an end of the probe;
   determining, when the probe is installed with a downward orientation, whether the time coordinate of a reference $X_{R1}$ is greater than the time coordinate of the reflection $P_1$ and that the measuring probe is covered by the filling material, and
   determining, when the probe is installed with an upward orientation, whether the time coordinate of the reflection $P_2$ is greater than the time coordinate of a reference $X_{R2}$ and that the measuring probe is covered by the filling material.

10. A processor configured to carry out steps of a method according to claim 9.

11. A non-transitory computer-readable medium on which a program element is stored, the program element which when implemented on a processor of a limit level switch instructing the switch to carry out steps of a method according to claim 9.

* * * * *